Sept. 22, 1970 P. GUYOT 3,529,420
ADJUSTMENT DEVICE FOR THE FLOW OF A LIQUID PROPELLANT
INTO A HYPERGOLIC REACTION SYSTEM
Filed Dec. 19, 1968 4 Sheets-Sheet 1

Inventor:
Pierre Guyot
By
Karl W. Flocks
Attorney

United States Patent Office 3,529,420
Patented Sept. 22, 1970

3,529,420
ADJUSTMENT DEVICE FOR THE FLOW OF A LIQUID PROPELLANT INTO A HYPERGOLIC REACTION SYSTEM
Pierre Guyot, L'Hay-les-Roses, France, assignor to Nord-Aviation Societe Nationale de Constructions Aeronautiques, Paris, France, a joint-stock company of France
Filed Dec. 19, 1968, Ser. No. 785,120
Claims priority, application France, Dec. 22, 1967, 133,639
Int. Cl. F02k 9/02; F16k 31/12
U.S. Cl. 60—39.74                         10 Claims

ABSTRACT OF THE DISCLOSURE

Adjustment device for the flow of a liquid propellant into a hypergolic reaction system having a combustion chamber containing the other propellant necessary for the reaction. It comprises, in combination, liquid propellant distribution duct with at least one injector with incorporated pilot device fixed on said duct in said combustion chamber; a pilot device circuit; a chamber; a piston in said chamber receiving, downstream, the liquid propellant to be distributed and, upstream, a counter-pressure of the liquid propellant under dynamic regime; a means for normally ensuring a reduced leakage of said counter-pressure; a means for increasing said leakage; an opening between the chamber and the distribution duct normally closed by extension of said piston, so that a variable flow of liquid propellant is obtained through said opening according to the proportioning of the leakage of the counter-pressure, the complete closure of said opening corresponding to a standing regime of the injector.

---

In hypergolic reaction systems (in particular described by George E. Moore and Kurt Berma in the article "A Solid-Liquid Rocket Propellant System" of the "Jet Propulsion" Journal of the American Rocket Society, pp. 965–968, November 1956), which includes two components reacting together spontaneously when they are presented to each other, it is customary, in practice, for one of said components to be in a liquid state whereas the other component may be either in a solid state or in another liquid state.

Such systems, which permit successive re-ignitions of combustions by the simple action of the injection of the liquid component in a combustion chamber, may, for example, be advantageously utilized in the correction of the piloting of an engine equipped with several small stabilizing nozzles disposed laterally as is known in practice.

Moreover, with such hypergolic reactions, one may consider reducing the time of response to the ignition of said combustions, due to the maintenance of a reduced accessory combustion, controlled by a pilot device fed with liquid propellant.

Furthermore, one may prefer, instead of such so-called "all or nothing" systems, a better adapted method in which the combustion regime is modulated, thus making it necessary to provide for an adjustment and a regulation of the flow of liquid propellant in function of the requirements.

Consequently, the present invention concerns a device for the adjustment and regulation of the flow of a liquid propellant into a hypergolic reaction system with a combustion chamber containing the other propellant necessary for the reaction, which device comprises, in combination, a duct for the supply of the liquid propellant to at least one injector with incorporated pilot device fixed on said duct in said combustion chamber, a chamber, a pilot device circuit between said supply duct and said chamber, a piston in said chamber receiving down-stream, the liquid propellant to be distributed and, up-stream, a counter-pressure of the liquid propellant under dynamic conditions, a means to ensure normally a reduced leakage of said counter-pressure, a control means to increase said leakage and an opening provided between said chamber and said supply duct and normally closed by an extension of said piston, so that a variable flow of liquid propellant is obtained through said opening according to the proportioning of the leakage of the counter-pressure, the complete closure of said opening corresponding to a standing of the injector, this standing reducing the response time of re-ignition.

Further, the injectors are essentially characterized in that their section is variable in function of the upstream injection pressure and that their opening threshold is adjustable thus permitting a standing operation short of said threshold.

Other characteristics and advantages of the present invention will be apparent from the following description in conjunction with the accompanying drawings in which.

Figure 1:
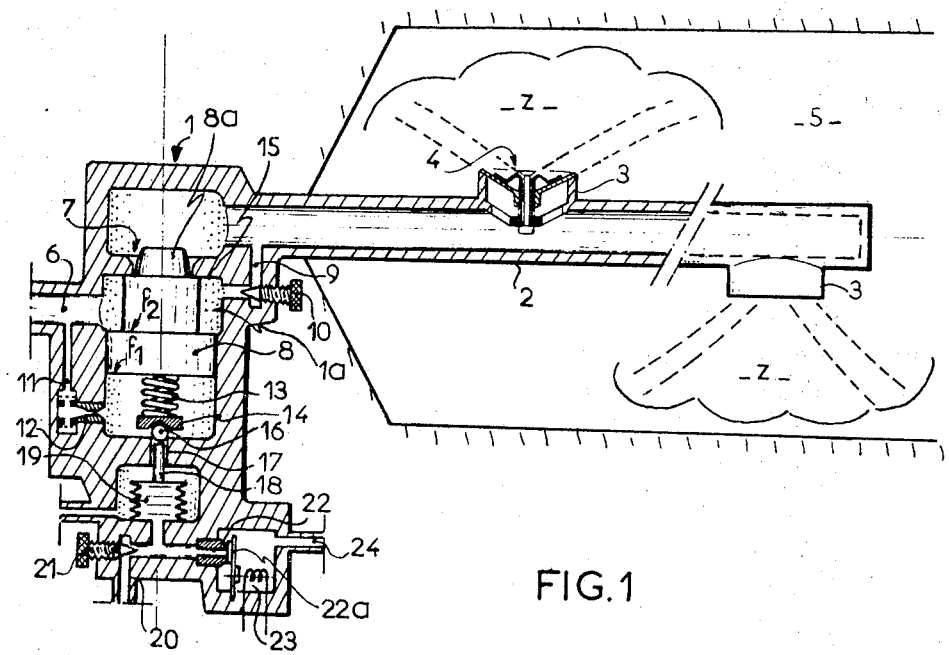
FIG. 1 is a diagram showing in accordance with the invention the arrangement of a flow regulator associated with injectors with integrated pilot devices inside a combustion chamber.

The device according to the invention comprises a flow regulator 1 with a chamber 1a and a distributor 2 of liquid propellant. The distributor itself comprises injectors 3 with integrated pilot devices 4 and the hypergolic reaction occurs in the region z when the said liquid propellant is presented, within a suitable combustion chamber 5, to another propellant either in the solid or liquid state.

Generally speaking, the regulator acts on the main flow of the liquid propellant arriving through a duct 6 in the chamber 1, by the variation of the section of a passage opening 7 made in the chamber 1, which variation is produced upon axial movement of a piston 8 in the chamber 1 and in the opening 7. The pilot device circuit supplied through a duct 9 is adjusted by action on a needle screw 10.

The head 8a of the piston 8 has a profile which diminishes in the direction chamber 1-distributor 2, thus establishing a passage flaw function of the axial movement of the piston.

An upstream counter-pressure may be taken off by a duct 11 and sent (under dynamic conditions) through a nozzle 12 on the face $f_1$ of the piston 8 so as to force the latter (with a pressure $f_1 + q - f_2$; $f_1$ being assimilated to the pressure on said face, $q$ being the strength of a spring 13 interposed between the piston and a movable element 14 and $f_2$ being the other face of the piston to which is assimilated the pressure exerted on said face) against an abutment wall 15, whereas a ball 16 contained in the seat of the element 14 allows a reduced (leakage) through a discharge orifice 17. When the dynamic regime increases as a result of the more substantial raising of the ball 16, obtained by the action of a push-rod 18, the pressure on $f_1$ falls and may even become distinctly lower than the one acting on $f_2$, which tends to move the piston 8, so that the reaction of the spring 13, the strength of which is thus much increased due to its stronger compression, attempts to reduce the passage at 17. Moreover, the movement of the push-rod 18 is effected by an auxiliary circuit of any inert gas under pressure acting on a diphragm bellows 19 through a conduit 20 with a flow adjusting screw 21. A stop-valve 22a actuated by a device 23 operating under a suitable electric voltage, permits the adjustment of the leakage through a conduit 22 for the gas which is then discharged through a conduit 24.

Figure 2:
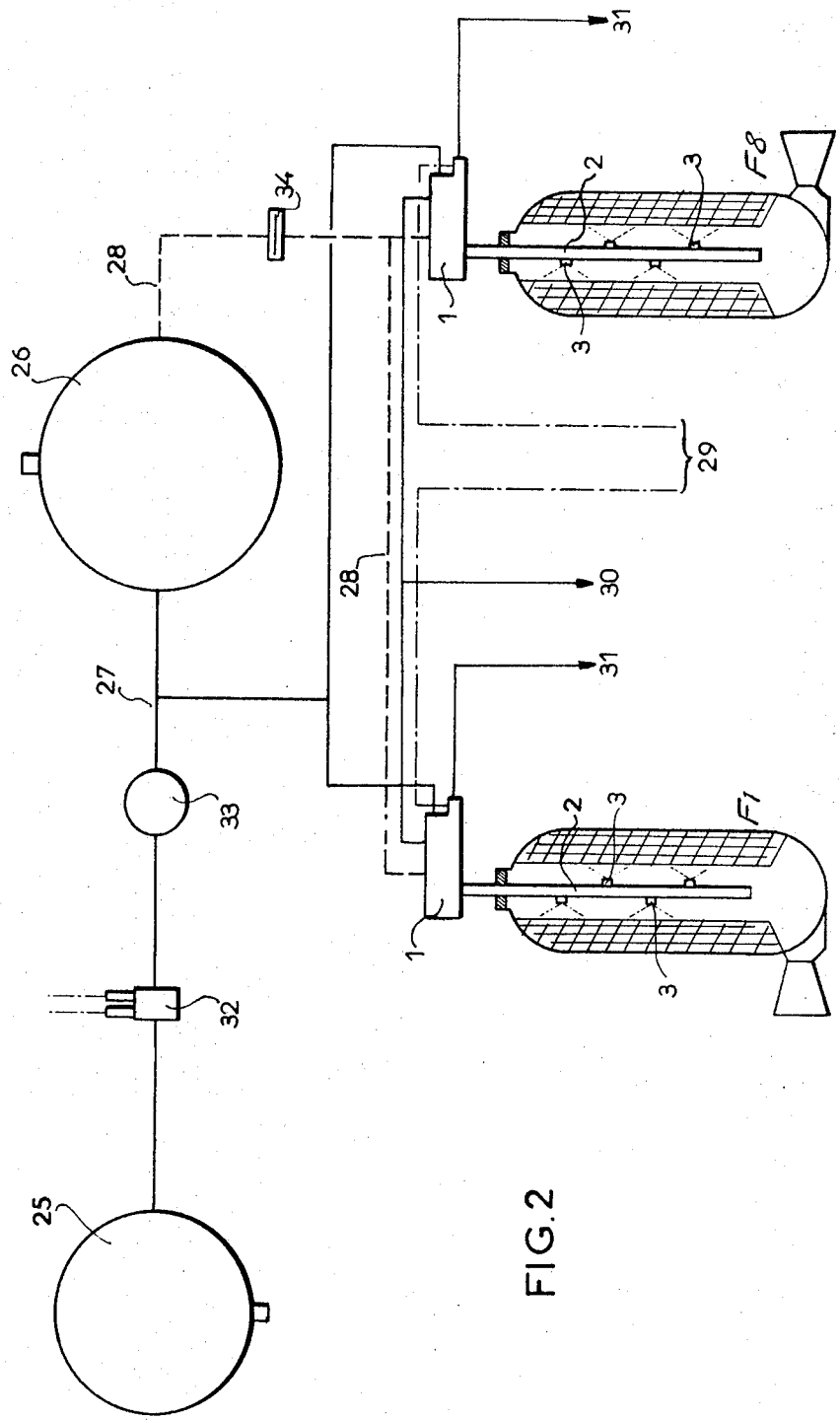
FIG. 2 is a diagram showing the application of the invention to the control of the combustion of auxiliary stabilizing rockets of an engine.

The invention may be applied to the stabilization of an engine by auxiliary lateral rockets with modulated thrust and with a short response time, which application is shown diagrammatically in FIG. 2 and essentially comprises eight hypergolic hybrid rockets F1 to F8 with injected liquid propellant and with solid propellant, and two tanks, one (25) for neutral gas and the other (26) receiving the liquid propellant of a mixture $NO_3H/N_2O_4$. Each unit essentially comprises a propellant flow regulator 1 and a distributor 2 with its injectors 3 with integrated pilot devices. The general circuit is completed by networks 27 for gas distribution, networks 28 for liquid propellant and networks 29 for electricity and the discharge of the gases and the leakage propellant is ensured respectively by the conduits 30 and 31. A pyrotechnic valve 32 ensures, at the moment of firing, the flow of the gas which is moreover expanded by a pressure-reducer 33 and a calibrated member 34 temporarily prevents the arrival of the propellant on the regulator.

Figure 3:
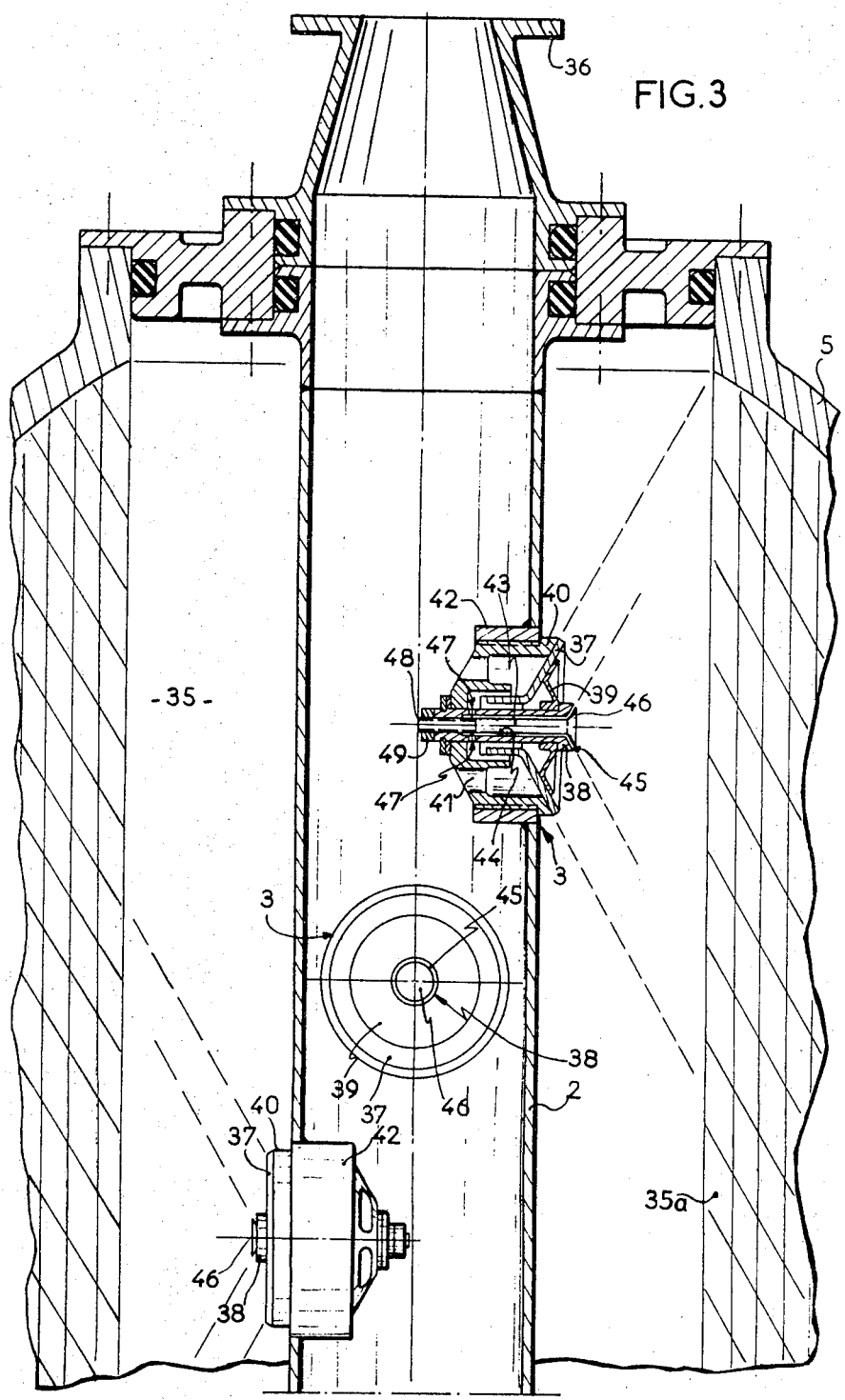
FIG. 3 shows, in partial longitudinal secton, a distributor comprising injectors for the injection of the liquid propellant into the combustion chamber of one of the solid propellant rockets.

The distributor 2 of liquid propellant, which is shown in FIG. 3 inside one of the rockets F1 to F8, is disposed in a combustion well 35 made in a solid propellant block 35a which is, moreover, housed inside the combustion chamber 5. Along the distributor issue injectors 3 with integrated pilot devices and the distributors are connected by a flange 36 to the regulator 1.

The injector 3 essentially comprises a conical cup 37 sliding on a central body 38 and a spring 39 holds said cup against a seat 40 which is moreover open at 41 and fixed to the distributor 2 by a threaded sleeve 42. The pilot device is essentially constituted by a rod 43 disposed in a recess 44 of the central body 38 which has an orifice 45 for a conical head 46 of the piston 43. The side wall of the central body 38 is drilled with holes 47 issuing into the recess 44. The adjustment of the pilot device is effected by a threaded part 48 of the rod 43 and a locking counter-nut 49.

The operation of the device according to the invention for the controlled injection of liquid propellant in a hypergolic reaction is the following:

When a pressure of liquid propellant appears in the chamber 1a, this propellant passes through the pilot device duct 9, which is adjusted by the screw 10, and it fills the distributor 2 comprising the injectors 3 with integrated checking devices. This same propellant then passes into the recess 44 of the central body 38 of the injector through the orifices 47 and is pulverized between the seat 45 and the head 46, creating a reduced hypergolic reaction in the zone z. This so-called "standing" operation occurs so long as the pressure of the liquid propellant, which is then under dynamic conditions, does not reach a sufficient level to compress the spring 39 of the injector 3. Once this level has been reached, as a result of an increase of pressure consecutive to an increase of the passage opening 7, the pressure of the propellant compresses the spring 39 causing pulverization of said propellant between the seat 40 and the cup 37 and, consecutively, the hypergolic reaction is then increased in the zone z.

It will be understood that this ejection of liquid propellant thus increases up to a level which is reached for a maximum opening of 7, this opening being moreover itself a function of the movements of the ball 16.

Thus, the regulation and the modulation of the injection of liquid propellant into the combustion chamber is directly in relation to the value of the pressure upstream of the propellant, to the ratios of the working surfaces, to the sections of the discharge ducts and finally to the proportioning of the gaseous leakage of the counter-pressure, obtained by the electric member 23 receiving suitable positioning orders.

It will readily be observed that it is thus possible, to realize, by the flow adjusting device of the invention, and as soon as in service, a standing regime so long as a certain pressure level is not reached, and then an all level regime producing, if need be, a modulation of combustion.

It will thus be seen that in such a device one may act, on the one hand, on the response time of the piston 8, by the choice of the socket of the nozzle 12 and the adjustment of the screw 21 as well as by the calibration of the spring 13 and that, on the other hand, one may regulate the flow of propellant, thus the modulation, by the adaptation of the gaseous leakage at 22 which is controlled by the device 23.

Figure 4:
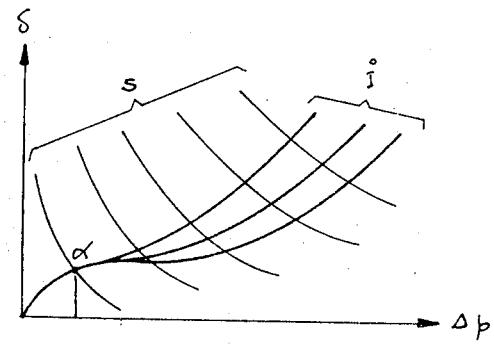
FIG. 4 is a diagram showing a network of curves indicating the adjustment possibilities of the device according to the invention.

The graph of FIG. 4 shows the regulating possibilities of such a device where it is seen that the choice of the section of the passage opening 7 well defines, for a given pre-adjustment I of the injector 3, the flow $\delta$ of the propellant ejected into the combustion chamber and that the point $\alpha$ corresponding to a section of the passage opening 7, $s=0$, coincides with the standing regime of the regulator 1.

Figure 5:
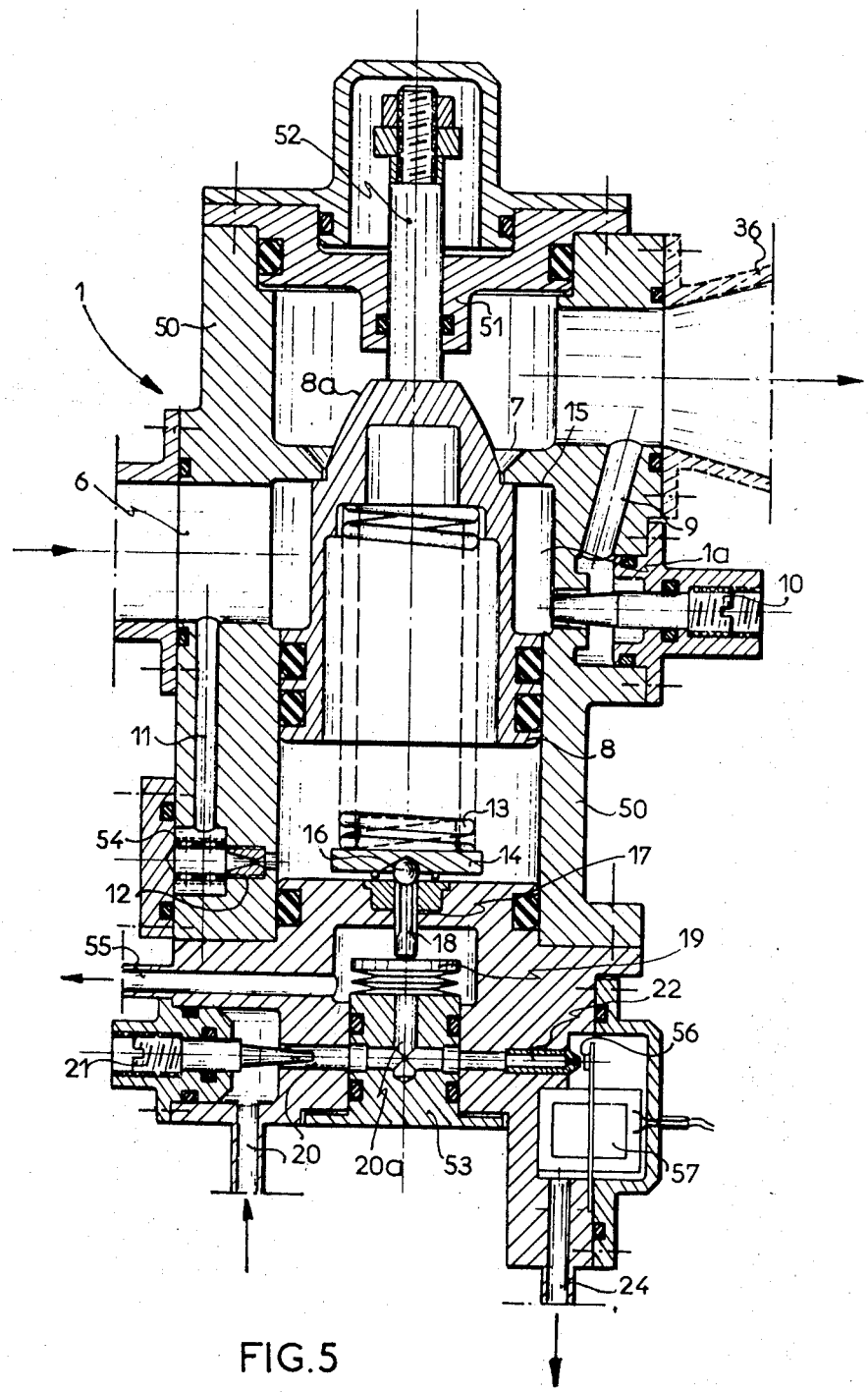
FIG. 5 shows, in longitudinal section, another embodiment of the flow regulator according to the invention.

In the more elaborate embodiment of the invention shown in FIG. 5, the regulator essentially comprises, for the liquid propellant circuit, the piston 8 sliding in the chamber 1a made in the body 50, a guide 51 for an extension rod 52 of the piston, the spring 13 resting on the seat 14 which bears on the ball 16, the push-rod 18 inserted between the ball 16 and the corrugated wall bellows 19 connected to a conduit 20a made in a base 53.

Moreover, the duct 11 is made in the body 50 to bring the counter-pressure upstream of the liquid propellant through a filter 54 and the nozzle 12, and the discharge of said propellant is effected by a duct 55.

The pilot device circuit comprises the duct 9 made in the body 50 and the needle screw 10 regulates the flow herein.

The pneumatic inlet duct 20 with the needle screw 21 for flow adjustment issues into the bellows 19 through the duct 20a. Discharge is ensured by a leakage 22 controlled by the vane 56 of a torque motor 57.

I claim:
1. Adjustment device for the flow of a liquid propellant into a hypergolic reaction system having a combustion chamber containing the other propellant necessary for the hypergolic reaction comprising:
   a propellant chamber,
   a liquid propellant supply circuit in said propellant chamber,
   a liquid propellant distribution duct in said combustion chamber,
   at least one injector fixed on said duct,
   a pilot device incorporated in said injector,
   a pilot device circuit connecting said propellant chamber to said duct,
   an opening for the passage of the liquid propellant provided between said propellant chamber and said duct,
   a piston disposed in said propellant chamber and an extension of which normally closes said opening,
   a liquid propellant counter-pressure circuit,
   a means for sending said counter-pressure behind said piston under a dynamic regime,
   a discharge orifice for said counter-pressure made in said propellant chamber, a means normally ensuring a reduced leakage of said counter-pressure through said discharge orifice, a spring interposed between said piston and said means ensuring the leakage of the counter-pressure, a control means capable of acting on said means normally ensuring a reduced leakage of the counter-pressure, whereby:

a variable flow of the liquid proepllant towards said injector is obtained through said passage opening according to the proportioning of the leakage of the counter-pressure, the complete closure of said opening by said extension of said piston corresponding to a standing regime of said injector.

2. Device according to claim 1 in which the said extension of said piston has a tapered form directed towards the said distribution duct.

3. Device according to claim 1 in which the said injector comprises:

a central body,
an annular seat,
a cup sliding on said central body,
and a head for said rod, which head is in said orifice.
said cup, so that the raising of said cup is function of the pressure of the liquid propellant.

4. Device according to claim 1 in which the said pilot device incorporated in said injector comprises:

a supply duct for the liquid propellant,
an outlet orifice for said duct,
an adjustable threaded rod inside said duct,
and a head for said rod, which head is in said orifice.

5. Device according to claim 1 in which the said pilot device circuit comprises an adjusting needle.

6. Device according to claim 1 in which the said means for sending under dynamic conditions the liquid propellant counter-pressure in a nozzle.

7. Device according to claim 1 in which the means normally ensuring a reduced leakage of the liquid propellant counter-pressure is a ball and a seat-forming movable element for said ball is placed between said ball and said spring.

8. Device according to claim 1 in which the control means capable of acting on the said means ensuring a reduced leakage of the liquid propellant counter-pressure comprises:

a pneumatic circuit,
a bellows fed by said circuit,
a normally closed leakage passage for said circuit,
a stop-valve for said leakage passage,
and a control means for said stop-valve.

9. Device according to claim 8 in which the said pneumatic circuit comprises an adjusting needle.

10. Device according to claim 8 in which the said control means for said stop-valve is a torque motor with a closing vane receiving positioning orders.

References Cited

UNITED STATES PATENTS

| | | | |
|---|---|---|---|
| 2,619,103 | 11/1952 | Davies | 251—44 |
| 2,751,919 | 6/1956 | Keil | 251—44 |
| 2,758,811 | 8/1956 | Peterson | 251—44 |
| 3,298,181 | 1/1967 | Greiner | 60—251 |
| 3,300,174 | 1/1967 | Urban | 251—29 |
| 3,302,403 | 2/1967 | Krzycki | 60—251 |

DOUGLAS HART, Primary Examiner

U.S. Cl. X.R.

60—240, 251, 254; 251—29, 44